United States Patent [19]

Harris

[11] 3,708,090
[45] Jan. 2, 1973

[54] VALVE FOR PRESSURIZED LIQUID DISPENSER

[76] Inventor: Arthur M. Harris, 135 Southwood Road, Fairfield, Conn. 06430

[22] Filed: May 21, 1970

[21] Appl. No.: 39,399

[52] U.S. Cl. ........................................... 222/402.22
[51] Int. Cl. ............................................. B65d 83/14
[58] Field of Search ....... 222/402.22, 402.21, 402.23; 239/573, 577, 579

[56] References Cited

UNITED STATES PATENTS

| | | | |
|---|---|---|---|
| 3,575,323 | 4/1971 | Steinman | 222/402.21 |
| 3,558,019 | 1/1971 | Hug | 222/402.22 |
| 3,547,405 | 12/1970 | Ewald | 222/402.22 X |
| 2,763,406 | 9/1956 | Countryman | 222/402.21 |
| 3,416,770 | 12/1968 | Green | 222/402.22 X |

Primary Examiner—Robert B. Reeves
Assistant Examiner—Norman L. Stack, Jr.
Attorney—Walter G. Hensel

[57] ABSTRACT

A valve assembly for aerosol dispensers having, in an apertured valve socket of a pressurized aerosol container, a valve seat of resilient material such as rubber with an aperture in registry with that of the valve socket; a substantially rigid valve disc of which the the upper surface forms a seal when in contact with the valve seat, having a tubular stem integral with the disc and extending through its aperture, adapted to receive a conventional spray nozzle on its outer end—the bore of the stem terminating at the valve disc and communicating with one or more radial ports normally closed by contact with the inner surface of the bore through the valve seat; and a valve housing of substantially rigid material, clamped by appropriate crimping or the like of the side walls of the valve socket against the edges of the valve seat to form a seal therewith, said housing having an inner chamber of somewhat smaller cross section than the valve disc with a connection at its lower end for a dip tube extending to the base of the container, and a counterbore adjacent the valve disc and large enough to receive the latter, the base of the counterbore having a fulcrum support normally holding the valve disc against the valve seat and located within the limit of peripheral contact of the disc with the valve seat, and a cut-away portion—such as a plane surface inclined to and intersecting the axis of the valve stem and extending from said fulcrum support to the opposite side of the valve housing, into which the valve disc may tilt by rotation about the fulcrum support to open a passage from the interior of the valve housing between the disc and valve seat to a radial port at the base of the valve stem, through which the pressurized contents of the container are released through the dip tube, valve housing, valve stem and nozzle; and resilient means—either the resilient valve seat on the side of the fulcrum support opposite said cut-away portion if said support is spaced inwardly from the limit of peripheral contact of the disc and valve seat (such that tilting of the disc about the fulcrum support toward the cut-away portion of the valve housing compresses the valve seat on the opposite side of said support), and/or a resiliently flexible leg extending downward from one side of the valve disc with its outer end bearing upon the cut-away portion of the base of the valve housing counterbore (especially when the said cut-away portion has a plane surface inclined to the axis of the valve stem axis)—such resilient means urging the valve disc when displaced by tilting of the valve stem and disc around the fulcrum support to contents-releasing position to return the same to sealing contact with the valve seat. When such a resiliently flexible leg is provided, the fulcrum support can be located at the peripheral limit of contact of the valve disc with the valve seat.

8 Claims, 6 Drawing Figures

INVENTOR.
ARTHUR M. HARRIS
BY Walter G. Hensel
ATTORNEY

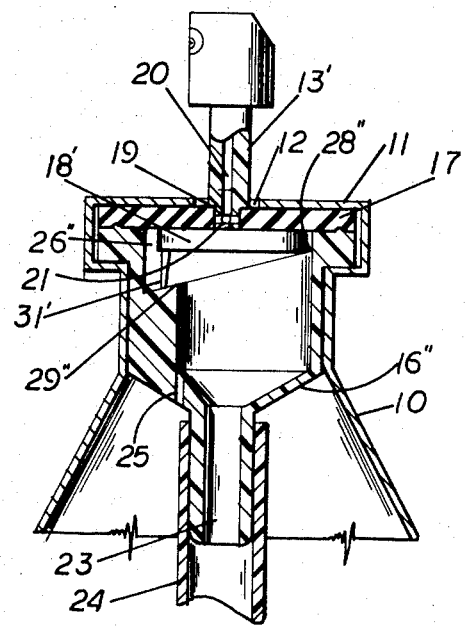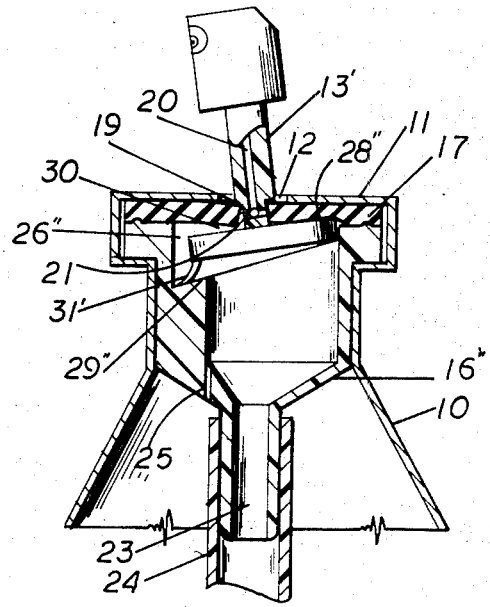

VALVE FOR PRESSURIZED LIQUID DISPENSER

This invention relates to an improved valve assembly for use in pressurized dispensers for liquids, emulsions or liquid suspensions—especially aerosol dispensers.

In the construction of valve assemblies for pressurized dispensers for such liquids, it is desirable to reduce to a minimum the number of parts and to avoid use of metal components which are subject to corrosion. It is also desirable for the sake of economy that the component parts be adapted to be manufactured by simple molding processes from appropriate plastics. Further, it is desirable to provide a valve assembly assuring reliable operation for release of the pressurized liquid, and reliable closure to prevent leakage when the release operation is terminated.

It is an object of this invention to provide a valve assembly affording each of the aforesaid desiderata, and susceptible of construction and operation without the necessity of metal springs, affording reliability in operation and utmost simplicity and economy in manufacture.

Other objects and advantages will be apparent to those skilled in the art from the following description of the invention, and from the specific embodiments thereof hereinafter described with reference to the accompanying drawings.

In accordance with this invention, there is provided a valve assembly, adapted to be fastened in a centrally apertured valve socket of a container for pressurized liquids such as aerosols, comprising a valve seat of resilient material such as rubber or similar synthetic elastomers, mounted against the inside end wall of the socket and having an aperture no larger than the aperture of the socket and in registry therewith. The valve assembly further includes a substantially rigid valve member or disc, having an upper surface shaped to form a seal with the lower surface of the valve seat when in contact therewith circumferentially of the aperture therein, and a tubular valve stem — integral with the valve disc — extending outward therefrom through the apertured valve seat and socket, adapted to receive on its outer end, a spray nozzle of the type conventionally used for aerosol containers. The bore of the valve stem terminates at the junction thereof with the valve disc, and is provided at this point with one or more lateral (radial) ports which are normally sealed by the wall of the valve seat aperture when the valve seat is in sealing contact with the valve disc.

Further, the valve assembly of my invention includes a valve housing of substantially rigid material, mounted in the valve socket of the container against the valve seat. The housing has an interior chamber or bore, somewhat smaller in cross section than the valve disc, having a tubular extension at its lower end, adapted to be connected to a conventional dip tube extending toward the base of the container with its lower end immersed in the pressurized liquid contained therein. The upper end of the housing is provided with an external annular flange of about the same external size and shape as the valve seat, clamped against the outer edge portion of the latter in sealing contact by a supporting annular shoulder formed e.g. by crimping, in the wall of the valve socket. At its upper end, opposite said tubular connection, the valve housing is provided with a counterbore of such size and shape as to receive the valve disc—the counterbore forming a continuation of larger cross sectional size of the inner chamber or bore mentioned above.

In accordance with this invention, the base of the counterbore includes a fulcrum support (e.g., a line or point or series of points) in supporting contact with the lower face of the valve disc so as to hold the same normally in sealing contact with the resilient valve seat, and a cut-away portion having a surface extending at least from said fulcrum support away from the valve disc to the opposite side of the valve housing—said cut-away portion being advantageously constituted by a plane surface intersecting and inclined to the axis of the valve stem and extending from the fulcrum support to the opposite side of the valve housing counterbore.

When the fulcrum support is located at the axis of the valve disc and stem, or intermediate said axis and the peripheral limit of contact of the valve disc with the valve seat, but inwardly spaced from said limit, the resilient valve seat on opposite sides of the fulcrum support exerts resilient pressure on the valve disc, resisting its displacement around the fulcrum, and thus tends to retain the valve disc in sealing contact with the valve seat. Said resilient force may be advantageously supplemented by a resiliently flexible leg, integral with and extending downward from one side of the valve disc such that its lower end is supported on the cut-away surface—especially, a plane surface inclined to the axis of the valve disc and stem—its length being such as to hold its side of the valve disc in sealing contact with the valve seat. If the fulcrum support is located at or beyond the limit of peripheral contact of the valve disc with the valve seat, rather than inwardly spaced therefrom, then a flexible leg as just described cooperates on its side of the valve disc with the fulcrum support on the opposite side to hold the valve disc resiliently in sealing contact with the valve seat.

Once sealing contact of the valve disc with the resilient valve seat is established, the fluid pressure within the pressurized container supplements the resilient pressures above described to hold the valve disc against the valve seat, thus preventing escape of the pressurized contents.

Operation of the valve assembly of this invention to release the pressurized contents of the container involves tilting of the valve stem and its integral valve disc by lateral and downward manual force usually applied to the spray nozzle on the outer end of the stem, whereby the valve disc is rotated about the fulcrum support on the base of the valve housing counterbore — the side of the valve disc toward which the tilting force is applied being tilted downward toward the cut-away portion of the counterbore — especially the plane surface inclined to the axis of the valve stem in its original position — the downwardly displaced portion of the valve disc thereby moving out of contact with its side of the valve seat, and a radial port at the base of the valve stem moving out of contact with the wall of the valve seat bore, thus opening a passage from the interior of the valve housing to the valve stem bore and releasing the pressurized contents of the container which pass through the dip tube into the valve housing, thence through the passage and port just described, and then through the valve stem bore to the spray nozzle. Tilting of the valve disc about its fulcrum support causes that side of the disc opposite the depressed side to tilt upward against the resilient pressure of the valve seat and/or causes the resiliently flexible leg on the depressed side of the valve disc to flex, especially to flex outward from the valve disc axis while its outer end slides downward along the inclined plane surface of the cut-away portion of the base of the valve housing counterbore. The flexed leg and/or the compressed portion of the resilient valve seat resiliently urge the valve disc around the fulcrum support to return to sealing contact with the valve seat, and this occurs when the manual tilting force is released, thus stopping release of the pressurized contents of the container.

Specific embodiments of my invention are illustrated in the accompanying drawings, wherein FIG. 1 is a side view mainly in axial cross section of a valve assembly in accordance with my invention, mounted in the valve socket of an aerosol dispenser (of which only the upper part is illustrated) provided with a conventional spray nozzle and dip tube (part of which is shown).

FIG. 5 is similar to FIG. 1, but illustrates provision of a fulcrum support on the base of the valve housing at the limit of peripheral contact of the valve disc with the resilient seat.

FIG. 6 illustrates the valve assembly of FIG. 3 in contents-releasing position.

Figure 1:
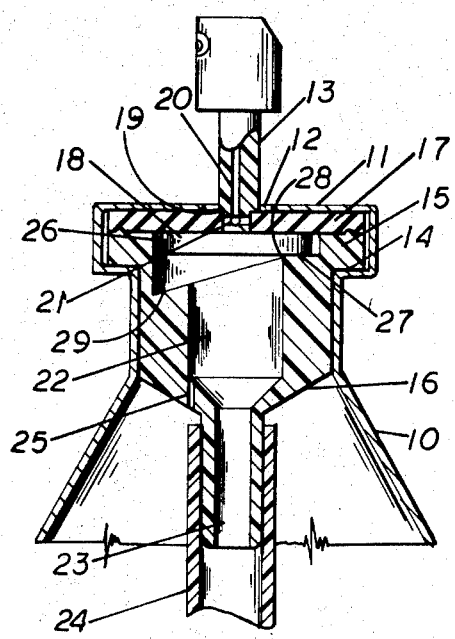

As shown in FIG. 1, a valve assembly in accordance with my invention is shown mounted in the valve socket at the top of a pressurized aerosol container 10 of sheet metal or other pressure-resistant material, and of conventional cylindrical shape. The generally flat upper surface 11 of the socket is centrally apertured at 12 to accommodate a valve stem 13 extending upward through the aperture, and a crimped portion spaced downward from the top 11 provides an annular shoulder 14 clamped against and supporting an external annular flange 15 at the upper end of valve housing 16 in sealing contact with the periphery of a centrally apertured resilient valve seat 17, which is in turn peripherally clamped between flange 15 and top 11 of the valve socket in sealing contact with the latter. The valve stem 13 (which is provided at its outer end with a spray nozzle of conventional design for aerosol dispensers) is integral with a valve disc 18 to which it is centrally joined by a portion 19 of reduced diameter corresponding to that of the central aperture of the valve seat 17, and of the same length as the thickness of the valve seat, so as to provide an annular groove at the base of the valve stem to receive the inner edge of the valve seat aperture. The central bore 20 of valve stem 13 terminates adjacent valve disc 18 in a series of radial ports 21 extending outward to the surface of annular groove 19.

The valve housing 16 has an internal chamber formed by a bore 22 of a diameter somewhat smaller then that of valve disc 18, extending downward to communicate with a nipple 23 to which is connected a dip tube 24 extending downward to a point adjacent the base of the container 10 where it is immersed in the pressurized liquid to be dispensed. Optionally, the wall of the chamber 22 may be provided with a cappillary opening 25 affording limited access to said chamber of the pressurized vapor phase within the container 10. In this way, the pressurized contents released from the chamber 22 through the valve stem 13 and its terminal spray nozzle are diluted by the simultaneously released vapor phase entering the chamber 22 through the capillary opening 25.

The upper end of the valve housing 16 has a counterbore 26 of slightly larger diameter than the valve disc 18 and of such depth at one side as to provide a shoulder 27 supporting the valve disc 18 in sealing contact with the valve seat 17, but terminating at a fulcrum point 28 intermediate the axis of the valve disc 18 and its periphery, said fulcrum point being spaced inward from the latter. From the fulcrum point 28, the base of the counterbore 26 slopes downward at an acute angle with the valve stem axis. The fulcrum 28, being within the periphery of the valve disc 18, normally supports the latter in sealing contact with the resiliently yielding valve seat 17 which provides a resilient force preventing access of the pressurized contents of the container 10 to ports 21 and bore 20 of valve stem 13.

When the stem 13 is subjected to downward manual force applied to its terminal spray nozzle, it tilts the valve disc 18 about the fulcrum point 28 (as shown in FIG. 1A) toward the downwardly sloping base 29 of counterbore 26 and correspondingly away from that side of the valve seat 18, opening a passage 30 from the interior of the valve housing to the aperture of the valve seat 18. At the same time, such tilting causes the annular grooved portion 19 of the valve stem to cam the lower edge of the valve seat aperture downward and out of contact with said annular groove 19 of the valve stem, thus opening passage 30 to a port 21 ot the valve stem. So long as the valve disc 18 is held in this position, the pressurized liquid contents of the container 10 is forced upward through the dip tube 24 through the chamber 22 of the valve housing, passage 30, port 21 and valve stem bore 20 to the spray nozzle on the outer end of the valve stem. There, it is emitted in the form of a spray, admixed with such portion of the pressurized vapor phase of the contents of container 10 as is admitted to chamber 22 through capillary opening 25.

When the aforesaid manual tilting force is released, the resilient force applied by the compressed portion of valve seat 17 against upwardly displaced portion of valve disc 18 to the right (in FIG. 1 and 2) of the fulcrum point 28, moves the disc 18 clockwise around the fulcrum point, bringing the left hand side of the valve disc 18 into sealing contact with the valve seat 17 and at the same time, returning port 21 to sealing contact with the adjacent inner surface of the aperture of the valve seat 17. Once such sealing contact is re-established between the valve disc 18 and valve seat 17, the interior pressure within the container 10 holds the disc 18 against the valve seat 17, preventing escape of the pressurized contents of container 10 until the next spraying operation.

Figure 3:
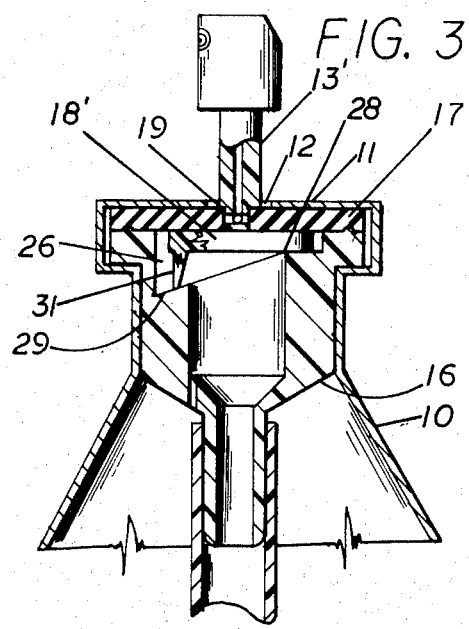
FIG. 3 is also similar to FIG. 1, but illustrates a modified form of valve disc.
Figure 4:
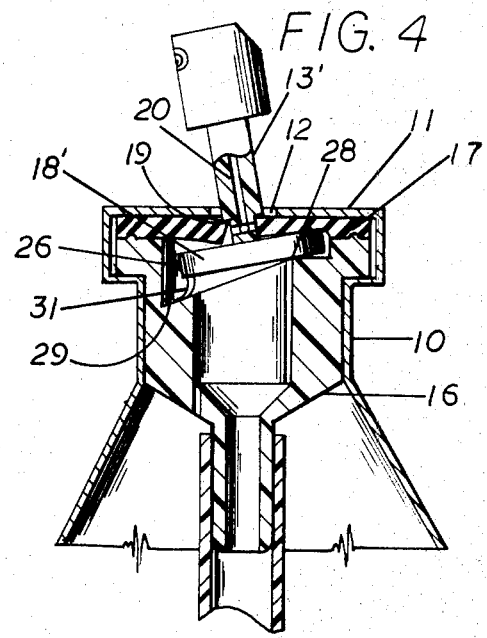
FIG. 4 illustrates the valve assembly in FIG. 2 in contents-releasing position.

FIGS. 3 and 4 show a modification of the valve assembly of FIGS. 1 and 1A, wherein the valve disc 18' is provided with a resiliently flexible leg 31, extending downward therefrom on the side opposite fulcrum 28, into contact with sloping surface 29 of counterbore 26, and providing supplementary support to hold valve disc 18' in contact with valve seat 17. When valve stem 13' is tilted (as shown in FIG. 4), the leg 31 flexes outward as its tip slides along the downwardly sloping surface 29 of the base of counterbore 26, and on release of the stem-tilting force, resiliently urges its side of the valve disc 18' into contact with valve seat 17. The flexed stem, cooperating with sloping surface 29 of the counterbore 26, thus supplements the resilient force of the compressed portion of valve seat 17 on the opposite side of fulcrum point 28.

Figure 2:
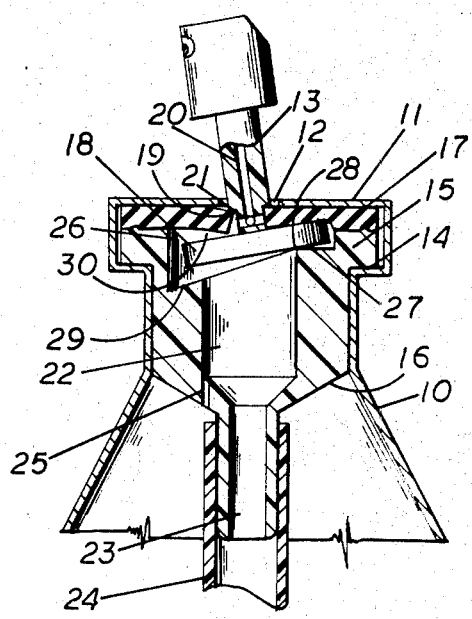
FIG. 2 is a view similar to FIG. 1, but showing the valve assembly in contents-releasing position.

FIGS. 5 and 6 show a still further modification of the valve assembly according to my invention, wherein, as distinguished from the construction shown in FIGS. 1 and 2, the fulcrum point 28" is located at the limit of peripheral contact of the valve disc 18' with the valve seat 17. In this case, the fulcrum point 28" supports the edge of the valve disc 18' in contact with the valve seat 17, but no compression of the valve seat 17 occurs adjacent the fulcrum point when the valve stem 13" is tilted to spraying position as shown in FIG. 6. However, the resiliently flexible leg 31' extending downward from disc 18' opposite fulcrum point 28", having flexed outward through contact with sloping surface 29" of counterbore 26" of the valve housing exerts a resilient force urging disc 18' clockwise about fulcrum point 28", returning the same to sealing contact with valve seat 17 when the manual tilting force applied to the valve stem 13' is released.

As will be obvious to those skilled in the art, the fulcrum point 28 of FIGS. 1 and 3 can be located at any point from the valve stem axis to a point spaced inwardly from the limit of peripheral contact of the valve disc with the valve seat — the location of said fulcrum point at the limit of said periphery (or beyond the same), as shown in FIG. 5, requiring merely a supplementary resilient support, such as that afforded by resiliently flexible leg 31' of which the lower end is supported on the sloping surface 29" of the base of counterbore 26" of the valve housing.

In each of the valve assemblies illustrated in the drawings, the central aperture 12 of the valve socket is advantageously constructed somewhat larger in diameter than the valve stem 13 (or 13') to facilitate tilting of the latter together with the valve disc 18 (or 18') about the fulcrum point 28 (or 28"). The upper edges of the annular groove 19 at the base of the valve stem 13 (or 13') remains in sealing contact with the upper surface of the valve seat 17 during such tilting operation, and the inner surface of the valve seat aperture provides a closure for the radial port or ports 21 on the side or rear of the valve stem opposite the port 21 which is opened by tilting of the valve stem on the side toward which tilting occurs.

The container 10, conventionally of sheet metal, can be made of any other pressure-resistant sheet material which is substantially inert toward the liquid contents of the container e.g. of polyethylene, polystyrene, cellulose esters or the like. The valve stem and disc and the valve housing are appropriately made of substantially rigid plastic, which, in a relatively thin layer as provided in the leg 31 or 31', is sufficiently flexible to bend resiliently in response to tilting force applied to the valve disc and stem. Suitable materials for these parts are, for example, polyethylene, polystyrene, polymethylmethacrylate, cellulose esters and similar plastics, selected in each case to be inert toward the intended contents of the pressurized container. The valve seat is made of resiliently yielding sealing material such as rubber, or synthetic elastomers such as butadiene polymers, chloroprene, Buna S or GRS rubber. Again, the material chosen should be inert (i.e. against chemical reaction, swelling or dissolution) toward the liquid contents of the pressurized container.

It will be observed that my valve assembly consists of but three essential parts for mounting in the valve socket of a pressurized container, namely, a valve seat, a valve disc and integral valve stem, and a valve housing, each of which can be readily molded by conventional procedures from conventional plastics. No metal parts are required, and the assembly of the parts is extremely simple, involving merely threading the valve stem through the apertured valve seat, mounting these parts in the valve socket of the container, inserting the valve housing in the socket, and clamping the elements in the socket by crimping the socket wall or similar operation.

Aerosol mixtures suitable for dispensing in a container equipped with a valve assembly in accordance with this invention are well known in the art. They include the component to be sprayed when released from the container, together with a propellant, namely, a pressure-liquified normally gaseous component in which the component to be sprayed is dissolved, emulsified or suspended. Such propellants are usually polyfluoro- or polyfluoropoly-chloro derivatives of lower aliphatic hydrocarbons. The vapor pressure of the propellant maintains the container contents under pressure. When the pressurized contents are released by operation of the valve assembly of this invention, the propellant vaporizes and the non-volatile component to be sprayed is emmitted in atomized form from the spray nozzle at the top of the valve stem.

Variations and modifications which will be obvious to those skilled in the art can be made in the foregoing specific embodiments of my invention without departing from the scope or spirit thereof.

I claim

1. A valve assembly for a pressurized container comprising in combination:

a. an annular valve seat of resiliently yielding material, b. a valve disc having an upper surface engageable and adapted to form a seal with said seat, c. a tubular valve stem on said valve disc, extending through the valve seat, the bore of said stem terminating at the valve disc and communicating at said terminal with at least one lateral port, d. and a valve housing secured at its upper end in sealing contact with said valve seat and connected at its lower end with a dip tube, said housing having a shoulder engaging the lower surface of said valve disc at a peripheral portion of the disc and constituting a fulcrum support therefor to position said valve disc against said valve seat, said shoulder sloping away from said valve disc, tilting of said valve disc downward about said fulcrum support opening a passage for the contents of said pressurized container from the interior of said valve housing between said valve disc and valve seat to at least one of said lateral ports at the base of said valve stem, and thence to the central bore of the latter, and e. said valve assembly further including means normally urging said valve disc upward about said fulcrum support into contact with the under surface of said valve seat.

2. A valve assembly as defined in claim 1 wherein said fulcrum support is located within the range from the axis of said valve stem to a point within but spaced from the periphery of said valve seat.

3. A valve assembly as defined in claim 2 wherein the surface of said shoulder adjacent to said fulcrum support clamps said valve disc against said valve seat.

4. A valve assembly as defined in claim 2 wherein compression of said valve seat by said valve disc when the latter is tilted exerts force against said disc which tends to return the disc.

5. A valve assembly as defined in claim 1 wherein said shoulder of said valve housing has a substantially plane surface, inclined to and intersecting the axis of said valve stem.

6. A valve assembly as defined in claim 5, wherein said means resiliently urging said valve disc about its fulcrum support comprises a resiliently flexible leg integral with said valve disc, having its outer end supported on the shoulder in the housing.

7. A valve assembly as defined in claim 6 wherein said fulcrum support is located at the limit of peripheral contact of said valve disc with said valve seat.

8. A valve assembly for a pressurized container, comprising in combination:

a. an annular valve seat of resiliently yielding material, b. a valve disc member having an upper surface engageable and adapted to form a seal with said valve seat, c. a tubular valve stem on said valve disc member, extending through the valve seat, the bore of said stem terminating at the valve disc member and communicating at said terminal with at least one lateral port, d. and a valve housing member secured at its upper end in sealing contact with said valve seat and connected at its lower end with a dip tube, said housing member having a shoulder engageable with the under side of said valve disc member at a peripheral portion of the disc and constituting a fulcrum support therefor to position said valve disc member against said valve seat, said shoulder 70 away from said valve disc member, tilting of said valve disc member downward about said fulcrum support opening a passage for the contents of said pressurized container from the interior of said valve housing member between said valve disc member and valve seat to at least one of said lateral ports at the base of said valve stem, and thence to the central bore of the latter, and e. said valve assembly further including means normally urging said valve disc member upward about said fulcrum support into contact with the under surface of said valve seat, one of said members having a resiliently flexible leg extending therefrom, the terminus of said leg engaging the other part, said leg constituting said means for normally urging the valve disc member upward.

* * * * *